C. L. HARPER.
STRAP FASTENER.
APPLICATION FILED APR. 4, 1918.
1,310,119.
Patented July 15, 1919.
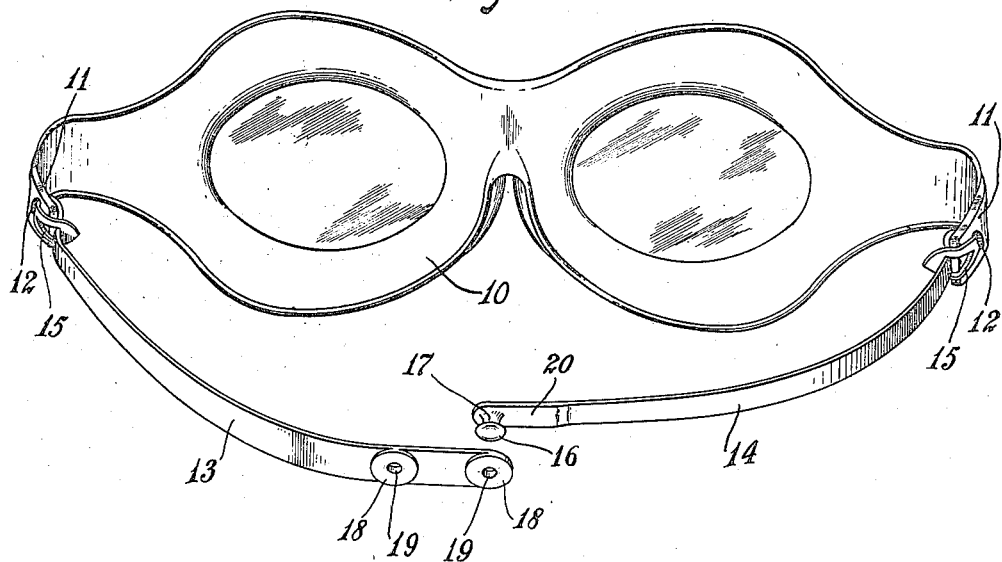
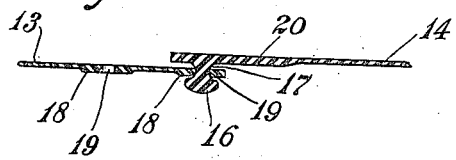
Inventor
Charles L. Harper
By Robert M. Pierson
Atty.

UNITED STATES PATENT OFFICE.

CHARLES L. HARPER, OF AKRON, OHIO, ASSIGNOR TO THE B. F. GOODRICH COMPANY, OF NEW YORK, N. Y., A CORPORATION OF NEW YORK.

STRAP-FASTENER.

1,310,119. Specification of Letters Patent. Patented July 15, 1919.

Application filed April 4, 1918. Serial No. 226,577.

*To all whom it may concern:*

Be it known that I, CHARLES L. HARPER, a citizen of the United States, residing at Akron, in the county of Summit and State of Ohio, have invented a certain new and useful Strap-Fastener, of which the following is a specification.

This invention relates to fasteners for connecting parts such as the ends of a head-strap for goggles, and its object is to provide a connector which will combine the qualities of simplicity, cheapness, strength, durability, and security in a greater degree than prior devices of its kind.

Of the accompanying drawings,

Figure 1 is a perspective view of a pair of goggles provided with a strap fastener constructed according to my invention, the members of the fastener being separated.

Fig. 2 is a longitudinal section of the strap-ends and fastener, with the members connected.

In the drawings, 10 is a pair of goggles formed with ears 11, 11 having perforations 12, 12 through which are looped the outer ends of the two strap-sections 13, 14, the latter being composed of soft vulcanized rubber. The connection may be in the nature of a slip-knot made by providing a longitudinal slit 15 in the strap section, near its end, and passing said section through the slit.

The fastener for the meeting ends of the strap-sections preferably comprises a button having a head 16 and a reduced neck 17, both formed of soft vulcanized rubber molded integrally with the strap-section 14, and one or more soft, vulcanized rubber rings or eyelets 18 (two being here shown) molded integrally with the strap-section 13 and located at different points along said section so that the effective length of the strap may be varied to suit different wearers. The rings or eyelets could be flush with the strap body and their margins partially of indefinite extent, but they are preferably embossed or raised on one surface of a thin strap as shown, so as to save material in the strap body while providing ample strength as fastener members. The apertures 19 in the rings, preferably of circular form, are normally smaller in diameter than the button head 16, so that the rings have to be stretched to go over said head.

The end of strap section 14 is preferably thickened at 20 to provide a strong base for the button.

In operating my invention, the connection is effected by stretching one of the eyelets 18 until the button head 16 passes through, whereupon the resiliency of the rubber eyelet automatically contracts it about the neck of the button and prevents the connection from becoming unfastened by any ordinary strain upon the strap ends. The disconnection may be made with equal facility when desired. The fact that both eyelet and strap are flexible makes it possible to bend the strap and eyelet at the latter in getting the eyelet on and off the button. The clinging property of the rubber surfaces aids in keeping the parts fastened. The device is more simple, cheap and durable than a fastener including one or more metal parts, since it is composed entirely of rubber and the members are formed integrally with the strap sections in the operation of molding the latter. One effect of this construction is that the strain on the rubber eyelet or button, as the case may be, is uniformly communicated to its strap or other supporting part, thus dispensing with metal or other securing means having a tendency to stiffen and tear the members in which they are inserted. Some of the advantages of the invention could, however, be realized if the button were made partly or wholly of a hard material. The word "strap" used in the claims covers any equivalent flap or member adapted to be connected to another member by means of the fastener.

I claim:

1. In a fastener, the combination, with the parts to be connected, one of which is a soft-rubber strap section, of a soft-rubber eyelet integrally formed on said strap section, and a button on the other part having a head larger than the normal size of the aperture in said eyelet, and a reduced neck.

2. In a fastener, the combination of two soft-rubber strap sections, one having a thickened end on which is integrally formed a soft-rubber button, the other having an integral thickened eyelet adapted to be stretched over the head of said button.

In testimony whereof I have hereunto set my hand this second day of April, 1918.

CHARLES L. HARPER.